2,926,991
PREPARATION OF SODIUM BOROHYDRIDE

Robert W. Bragdon, Marblehead, Mass., assignor to Metal Hydrides Incorporated, Beverly, Mass., a corporation of Massachusetts No Drawing. Application July 11, 1956
Serial No. 597,068

2 Claims. (Cl. 23—14)

This invention relates to the preparation of sodium borohydride and particularly to the recovery of sodium borohydride from aqueous solutions of sodium borohydride and sodium hydroxide.

Sodium borohydride may be prepared by the reaction of sodium hydride with methyl borate to form a reaction mixture of sodium borohydride and sodium methoxide as illustrated by the equation:

$$4NaH + B(OCH_3)_3 \rightarrow NaBH_4 + 3NaOCH_3 \quad (1)$$

It is presently preferred to employ sodium hydride in the form of a finely divided dispersion of the sodium hydride in a white mineral oil. The reaction mixture thus obtained consists of a fine dispersion of solid reaction products in the mineral oil. If sufficient water is added to this dispersion to dissolve the solid reaction products, the solution may be separated easily from the oil. When the reaction mixture is dissolved in water, the sodium methoxide is converted to sodium hydroxide and methanol. Excess sodium hydride is converted to sodium hydroxide and hydrogen. The solution thus formed consists of water and methanol containing sodium hydroxide and sodium borohydride dissolved therein.

One method for isolating sodium borohydride from the above mentioned solution is described in the copending application of Edward R. Winiarczyk Serial No. 566,352, filed February 20, 1956, now abandoned. As described in that application, it is preferable first to remove the methanol from the solution to form a liquor consisting essentially of a water solution of sodium hydroxide and sodium borohydride. This liquor then may be agitated with isopropylamine or other solvent for sodium borohydride which is substantially immiscible with the liquor. When this mixture is permitted to settle two separate layers are formed, namely, (1) a solution of sodium borohydride dihydrate in isopropylamine and (2) an aqueous solution of sodium hydroxide. Anhydrous sodium borohydride may be recovered from the isopropylamine solution by vacuum evaporation.

In the copending application of James B. Vetrano and Robert W. Bragdon, Serial No. 504,676, filed April 28, 1955, now Patent No. 2,856,274, a method has been described for obtaining anhydrous sodium borohydride by crystallization from a water solution containing a predetermined amount of sodium hydroxide, such as about 15 to 17 percent by weight. The solution is heated to a temperature substantially greater than a predetermined lower crystallization temperature and its sodium borohydride content is increased to an amount greater than is required to render the solution saturated at the predetermined crystallization temperature. The solution then is cooled to the predetermined crystallization temperature thereby causing crystals of anhydrous sodium borohydride to form. These crystals may be separated from the motor liquor in any desired manner as by a centrifuge.

The present invention particularly contemplates a method for recovering sodium borohydride from a solution obtained by treating the previously described reaction mixture of sodium borohydride and sodium methoxide to dissolve the same and form a solution of water and methanol containing sodium borohydride and sodium hydroxide. Simple fractional crystallization of sodium borohydride from such a liquor after removal of the methanol has proved impractical because the invariant composition at which the solution is saturated with respect to both sodium hydroxide and sodium borohydride does not change significantly with temperature. Consequently, it is necessary to change the ratio of the amount of sodium hydroxide to the amount of sodium borohydride in this liquor to make possible the recovery of sodium borohydride therefrom by fractional crystallization.

I have discovered that if isobutanol is mixed with such a liquor, preferably after removal of substantially all the methanol by vacuum evaporation, and the mixture is permitted to settle two liquid layers are formed, namely, an alcohol-rich layer containing some water and an aqueous layer containing some alcohol. The ratio of sodium borohydride to sodium hydroxide by weight in the aqueous layer is substantially greater than in either the alcohol-rich layer or the original liquor. Consequently, sodium borohydride can be separated from the aqueous layer by fractional crystallization and sodium hydroxide can be separated from the alcohol-rich layer by fractional crystallization until the invariant composition again is obtained. The cycle of operations may then be repeated.

In place of isobutanol other alcohols may be used which are substantially immiscible with water in the presence of sodium hydroxide, such as n-propyl, isopropyl, n-butyl, n-amyl, isoamyl and secondary amyl alcohols and mixtures thereof. Although it is preferable to use one or more of these alcohols, a mixture thereof with methanol or ethanol may be used.

The composition of the above mentioned reaction mixtures usually is such that when it is dissolved in water, the ratio of the amount of sodium hydroxide to the amount of sodium borohydride by weight in the resulting solution is substantially the same as in a solution of sodium hydroxide and sodium borohydride in water which is saturated with both of these sodium compounds. Usually, when the methanol has been removed from the aqueous solution of this reaction mixture the resulting solution is substantially saturated with both sodium hydroxide and sodium borohydride.

The invention is illustrated further by the following specific example. An aqueous solution containing 14.3 percent sodium borohydride and 41.7 percent sodium hydroxide was shaken well with a portion of isobutanol. Two clear layers were formed. The upper layer of 70.7 grams contained 2.319 grams of sodium, 0.133 gram of boron and 0.0454 gram of hydrogen. The lower layer contained 14.04 grams of sodium, 2.60 grams of boron and 0.922 gram of hydrogen. The ratio of sodium borohydride to sodium hydroxide in the lower layer is calculated to be 0.60. The ratio of sodium borohydride to sodium hydroxide in the upper layer is 0.12 and in the original solution is 0.343. Since the compositions of both layers differ widely from that of the previously mentioned invariant composition, it is possible to separate sodium borohydride from the lower layer and sodium hydroxide from the upper layer by fractional crystallization.

I claim:

1. The method for preparing sodium borohydride which comprises forming a reaction mixture comprising sodium borohydride and sodium methoxide by reacting sodium hydride with a compound selected from the group consisting of methyl borate and sodium trimethoxyborohydride, dissolving said reaction mixture in water to form a solution consisting essentially of water and methanol containing sodium borohydride and sodium hydroxide dissolved therein, subjecting said solution to vacuum evaporation to remove substantially all the methanol and form an aqueous solution which is substantially saturated with both sodium borohydride and sodium hydroxide, mixing said aqueous solution with an alcohol selected from the group consisting of n-propyl, iso-propyl, n-butyl, iso-butyl, n-amyl, iso-amyl and secondary amyl alcohols and mixtures thereof, permitting said mixture to settle to form two layers in one of which the ratio of sodium borohydride to sodium hydroxide by weight is substantially greater than in the original solution, and separating sodium borohydride by fractional crystallization from said one layer.

2. The method as described by claim 1 wherein the selected alcohol is isobutanol.

References Cited in the file of this patent

UNITED STATES PATENTS

| | | |
|---|---|---|
| 2,446,868 | Cunningham | Aug. 10, 1948 |
| 2,542,746 | Banus et al. | Feb. 20, 1951 |
| 2,720,444 | Banus et al. | Oct. 11, 1955 |

FOREIGN PATENTS

| | | |
|---|---|---|
| 717,451 | Great Britain | Oct. 27, 1954 |

OTHER REFERENCES

Technique of Organic Chemistry, vol. III; edited by A. Weissberger; published by Interscience Publishers, Inc., N.Y. (1950); pp. 172, 296, 297.